United States Patent
Meador

(10) Patent No.: US 10,358,539 B1
(45) Date of Patent: *Jul. 23, 2019

(54) POLYIMIDE AEROGELS HAVING POLYAMIDE CROSS-LINKS AND PROCESSES FOR MAKING THE SAME

(71) Applicant: The United States of America as represented by the Administrator of the National Aeronautics and Space Administration, Washington, DC (US)

(72) Inventor: Mary Ann B. Meador, Strongsville, OH (US)

(73) Assignee: The United States of America as Represented by the Administrator of National Aeronautics and Space Administration, Washington, DC (US)

(*) Notice: Subject to any disclaimer, the term of this patent is extended or adjusted under 35 U.S.C. 154(b) by 214 days.

This patent is subject to a terminal disclaimer.

(21) Appl. No.: 15/245,650

(22) Filed: Aug. 24, 2016

Related U.S. Application Data

(63) Continuation of application No. 14/660,492, filed on Mar. 17, 2015, now Pat. No. 9,434,832.

(60) Provisional application No. 61/993,610, filed on May 15, 2015.

(51) Int. Cl.
    *C08G 73/10* (2006.01)
    *C08J 9/28* (2006.01)
    *B01J 13/00* (2006.01)
    *C08G 101/00* (2006.01)

(52) U.S. Cl.
    CPC ............ *C08J 9/28* (2013.01); *B01J 13/0091* (2013.01); *C08G 73/101* (2013.01); *C08G 2101/0091* (2013.01); *C08J 2201/04* (2013.01); *C08J 2205/026* (2013.01); *C08J 2379/08* (2013.01)

(58) Field of Classification Search
    CPC .................................................. C08J 2205/026
    See application file for complete search history.

(56) References Cited

U.S. PATENT DOCUMENTS

| | | | |
|---|---|---|---|
| 8,501,319 B2 | 8/2013 | Leventis et al. | |
| 8,637,582 B2 | 1/2014 | Gawryla et al. | |
| 8,785,589 B1 | 7/2014 | Tan et al. | |
| 9,434,832 B1* | 9/2016 | Meador | C08J 9/28 |
| 9,650,487 B1* | 5/2017 | Guo | C08J 9/28 |
| 2012/0175546 A1 | 7/2012 | Dong et al. | |
| 2013/0338247 A1 | 12/2013 | Leventis et al. | |
| 2014/0171526 A1 | 6/2014 | Cristadoro et al. | |
| 2014/0178658 A1 | 6/2014 | Qi et al. | |

OTHER PUBLICATIONS

Mary Ann B. Meador, Christian R. Alemaan, Katrina Hanson, Nakaira Ramirez, Stephanie L. Vivod, Nathan Wilmoth, and Linda McCorkle. Polyimide Aerogels with Amide Cross-Links: A Low Cost Alternative for Mechanically Strong Polymer Aerogels. Published Jan. 7, 2015. (Year: 2015).*

* cited by examiner

*Primary Examiner* — Michael M Dollinger
*Assistant Examiner* — Christina H. W. Rosebach
(74) *Attorney, Agent, or Firm* — Robert H. Earp, III; William M. Johnson

(57) ABSTRACT

An aerogel and process of making the aerogel is provided. The aerogel is a polyimide aerogel having polyamide cross-links formed using a triacid chloride cross-linker.

9 Claims, 4 Drawing Sheets

POLYIMIDE AEROGELS HAVING POLYAMIDE CROSS-LINKS AND PROCESSES FOR MAKING THE SAME

CROSS-REFERENCE TO RELATED APPLICATION

This application is a continuation of and claims priority to U.S. Non-Provisional patent application Ser. No. 14/660,492 filed on Mar. 17, 2015, now U.S. Pat. No. 9,434,832, which claims benefit of U.S. Provisional Patent Application Ser. No. 61/993,610 filed on May 15, 2014. The disclosures of these earlier-filed applications are hereby incorporated by reference in their entirety.

ORIGIN OF THE INVENTION

The invention described herein was made by employees of the United States Government and may be manufactured and used by or for the Government for Government purposes without the payment of any royalties thereon or therefore.

FIELD

The invention pertains to polymer aerogels. In particular, the invention relates to polyimide aerogels, including polyimide aerogels with polyamide cross-links.

BACKGROUND

Aerogels are low density solids having low thermal conductivity, low dielectric constant, and high surface area, among other properties, due to their fine pore structure. Aerogels consist on a solid network structure, and are made, for example, by extracting a liquid portion of a gel through supercritical fluid extraction while allowing the gel to maintain a solid structure. Polyimide aerogels combine low thermal conductivity and low dielectric constant with excellent mechanical properties in comparison with silica and polymer-silica hybrid aerogels.

Polyimides are polymers of imide monomers. Polyimides have the general chemical structure shown immediately below.

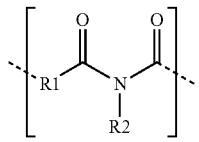

Polyimide aerogels are excellent insulators due to their high porosity, low thermal conductivity, flexibility, and low density. Accordingly, polyimide aerogels are useful for various applications ranging from lightweight substrates for high performance antennae, to flexible insulation for space suits and spacecraft decelerators such as inflatable structures for spacecraft entry, descent, and landing (EDL) on planets, among other applications. Finding cost efficient precursors, however, to synthesize polyimide aerogels is crucial to large scale manufacturing and commercialization.

Certain polyamines, organic compounds with plural primary amino groups, namely, 1,3,5-triaminophenoxybenzene (TAB), 2,4,6-tris(4-aminophenyl)pyridine (TAPP), octa-(aminophenoxy)silsesquioxane (OAPS), or 1,3,5-tris-(aminophenyl)benzene (TAPB), have been used to cross-link anhydride end-capped polyimide oligomers for synthesizing polyimide aerogels. Moreover, polyamine cross-linkers known to be suitable for synthesizing polyimide aerogels have been found to be commercially unavailable at times, and somewhat expensive, thus inhibiting scale up of manufacturing and production of polyimide aerogels for widespread use.

Another alternative process for obtaining cross-linked polyimide aerogels includes reacting dianhydrides with triisocyanates, and applying a room temperature cure. Thermogravimetric analysis (TGA) of aerogels produced at room temperature and 90° C. using this alternative process revealed weight loss of 5% to 7% with an onset of about 200° C., which is indicative of incomplete imidization.

Polyimide aerogels made without using any cross-linker tend to shrink undesirably during fabrication, and suitable products are believed to derive substantially only from syntheses using pyromellitic dianhydride. Linear polyamide-polyimide clay aerogel composites have also been fabricated for alternative processes for making polyimide aerogels. Polyamide-imides are thermosetting or thermoplastic, amorphous polymers. Freeze-drying instead of supercritical fluid extraction is used during such processes to remove the liquid. The clay acts as a template for the formation of the porous aerogel structure. The mechanical properties of the resulting gel, however, are weaker than desired, and the thermal conductivities are higher than those associated with polyimide aerogels formed using supercritical fluid extraction.

Thus, an alternative polyimide aerogel and process of manufacture is needed. In particular, a low cost alternative for mechanically strong polymer aerogels would be beneficial.

SUMMARY

Embodiments of the present invention provide solutions to these and other problems and needs in the art, and may provide solutions to problems and needs in the art that have not yet been fully solved by conventional polyimide aerogels and manufacturing processes. Embodiments pertain to polyimide aerogels, and processes for manufacturing polyimide aerogels formed using a low cost cross-linker and a polyimide oligomer solution.

Furthermore, processes of embodiments using a triacid chloride cross-linker enable use of amine capped polyimide oligomers, which can be stored for extended periods of time without significant loss of reactivity, unlike anhydride capped oligomers. The amine capped oligomers may be made in advance of use, and can react quickly with triacid chloride cross-linker. Accordingly, processes of embodiments are amenable to scaled-up and continuous process aerogel manufacturing for making, for example, roll-to-roll films and molded parts.

An aerogel in accordance with an embodiment may include a polyimide component cross-linked by a polyamide cross-link. The polyimide component may include 4, 4'-oxidianiline or 2, 2'-dimethylbenzidine, or a combination of 4, 4'-oxidianiline and 2,2'-dimethylbenzidine.

In another embodiment, a process useful for making a polyimide aerogel, may include providing a polyimide oligomer solution; chemically imidizing the polyimide oligomers of the provided polyimide oligomer solution, the polyimide oligomers comprising amine terminated polyimide oligomers formed using 4, 4'-oxidianiline (ODA) or 2, 2'-dimethylbenzidine (DMBZ), or a combination thereof;

and adding triacid chloride to the imidized polyimide oligomer solution to cross-link polyimide oligomers of the polyimide oligomer solution. The cross-linker may be 1,3,5-benzenetricarbonyl tricholoride (TAC or BTC).

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
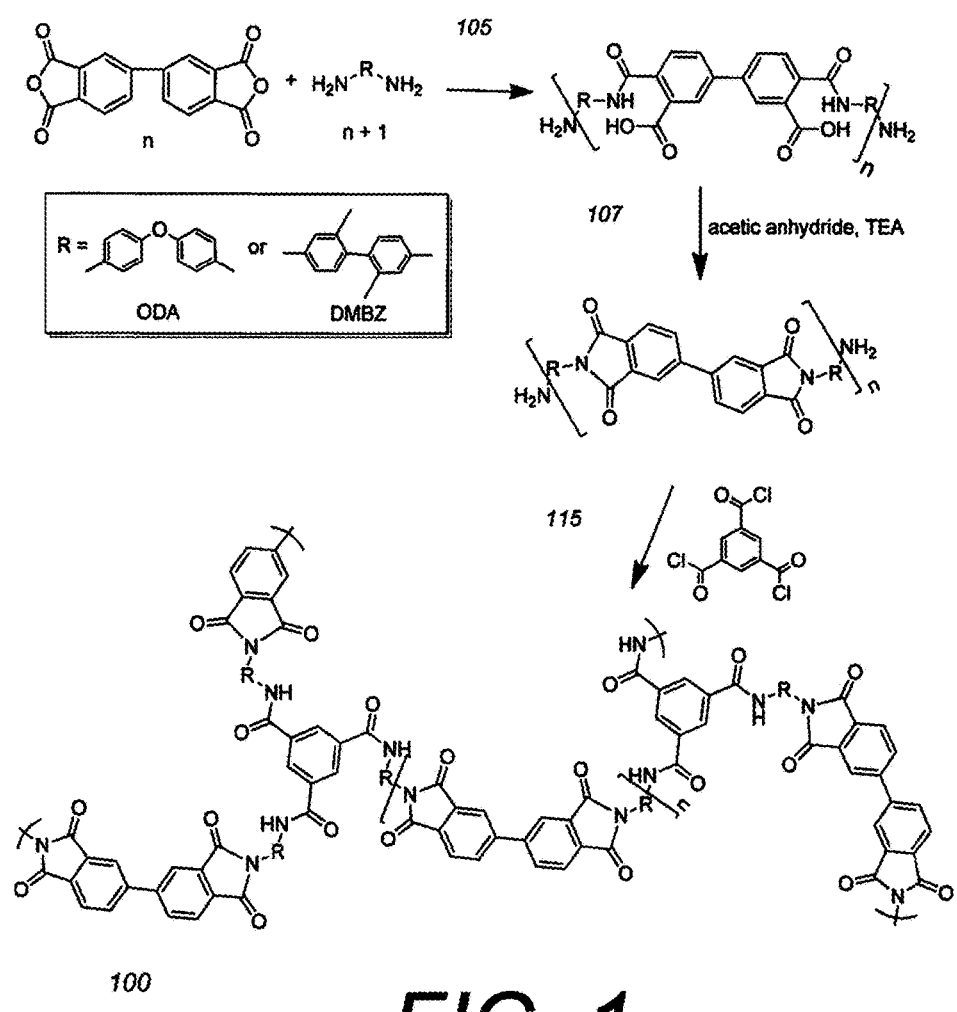
FIG. 1 shows a process for forming polyimide aerogel having polyamide cross-links in accordance with an embodiment of the present invention.

FIG. 1 shows a process 100 for forming polyimide aerogels using a cost-effective, commercially available triacid chloride cross-linker, according to an embodiment. In particular, FIG. 1 shows a process for forming polyimide aerogel by providing amine capped polyimide oligomers in solution. The amine capped polyimide oligomers are chemically imidized. Imidization is a cyclodehydration reaction including the conversion of a polyimide precursor into an imide. Then, triacid chloride is added to the solution to produce gels with tri-amide cross-links.

Triacid chloride such as 1,3,5-benzentricarbonyl trichloride (BTC) has been used to cross-link amine terminated polyamide oligomers. Instead of using BTC to cross-link amine terminated polyamide oligomers with anhydride terminated oligomers, the process shown in FIG. 1 may include generating amine-capped polyimide oligomers in solution that are chemically imidized, and then adding the BTC to produce gels with tri-amide cross-links in accordance with embodiments.

As shown in FIG. 1, process 100 may include, at 105, adding a number components n of biphenyl-3,3',4,4'-tetracarboxylic dianhydride (BPDA) to n+1 components of diamine, for example, 4,4'-oxidianiline or 2,2'-dimethylbenzidine, or equal parts ODA and DMBA. The n plus one equivalent of diamine may be added to the n equivalent of BPDA in solution, for example, in methylpyrrolidinone (NMP) and stirred until dissolved.

A variety of dianhydrides and diamines may be used in accordance with embodiments. For example, the dianhydride can be selected from the group consisting of benzophenone-3,3',4,4'-tetracarboxylic dianhydride (BTDA), 2,2'-bis(3,4'-dicarboxyphenyl)hexafluoropropane dianhydride (6FDA), and BPPDA. Also for example, the diamine can be selected from the group consisting of 2,2'-bis[4-(4-aminophenoxy)phenyl]propane (BAPP), 3,4'-oxydianiline (3,4'-ODA), 4,4'-oxydianiline (4,4'-ODA), p-phenylene diamine (PPDA), 2,2'-dimethylbenzidine (DMBZ), bisaniline-p-xylidene (BAX), 4,4'-bis(4-aminophenoxy)biphenyl (4,4'-BAPB), 3,3'-bis(4-aminophenoxy)biphenyl (3,3'-BAPB), 4,4'-(1,4-phenylenediisopropylidene)bisaniline (BisP), and 4,4'-(1,3-phenylenediisopropylidene)bisaniline (BisM). The dianhydride or diamine can be selected based on being readily available or commercially available.

The dianhydride and/or diamine can also be selected based on being known to impart different properties to polyimides in general. For example, BPDA, PPDA, and DMBZ are known to produce a relatively rigid backbone in polyimide structures, whereas ODA, 6FDA, and BTDA have flexible linking groups between phenyl rings resulting in less rigid structures. Two or more dianhydrides or two or more diamines can also be used in combination to produce various properties, including moisture resistance combined with flexibility.

In one embodiment, all of the diamine may be dissolved in solution. Then, dianhydride may be added at 107. In another embodiment, particularly wherein 10 wt. % solution is used with a 50/50 combination of ODA and DMBZ diamine, the ODA may be dissolved first. Then, all of the dianhydride may be added and completely dissolved. Subsequently, DMBA may be added to the solution. This is believed to cause the polyimide oligomer to form a backbone structure wherein the diamines are alternating instead of random.

Acetic anhydride may be added at 107 to the solution of, for example, diamine in DMBZ, and mixed to homogeneity. TEA may then be added. The solution may be allowed to sit for at least 15 minutes, and the resulting polyimide solution may be stored with minimal appreciable loss in reactivity for extended periods of time.

After the 15 minutes, at 115, BTC may be added to the solution formed at 107 to yield a gel. For example, a solution of BTC in NMP may be added, while stirring, to the oligomer solution produced at 107. The resulting solution may be poured into molds, and allowed to gel for about 5 to about 20 minutes, and in some embodiments, about 10 to about 15 minutes. The gels may be aged, then extracted into a solution of NMP in acetone, and soaked for 24 hours. Several solvent exchanges with preferably decreasing concentrations of NMP, and eventually only acetone, may be performed in 24 hour intervals. The gels may be converted to aerogels by supercritical fluid extraction. For example, multiple steps of subcritical and supercritical $CO_2$ soaking and rinsing may be performed. The gels may be submerged in solvent, and sealed under pressure, for example, at 78 bar and 25° C.

The sealed chamber may then be configured to soak for 30 minutes followed by slow venting (10 g/min) for about 2 hours. Vacuum drying overnight may remove remaining solvent.

ACTUAL EXAMPLES

Actual example aerogels made in accordance with embodiments were produced. The example aerogels were compared with related art aerogels and tested. Amine capped polyimide oligomers were formed in solution and chemically imidized. Then, triacid chloride was added to produce gels with triamide cross-links.

The example aerogels were characterized by nuclear magnetic resonance (NMR), Fourier transform infrared spectroscopy (FTIR), helium pycnometry, nitrogen sorption, scanning electron microscopy, compression testing, and thermal analysis. Repeat units in the oligomers were varied between 10 and 40 by using a ratio of n dianhydride units to n+1 diamine units. The effect of cross-link density on properties of the aerogels was observed. Further, the concentration of total polymer in the formed gel solutions was varied from 7 wt. % to 10 wt. %. As such, the effect of changing the cross-link density was observed.

Acetic anhydride (AA), TEA, and BTC were purchased from Sigma-Aldrich (3050 Spruce Street, St. Louis, Mo. 63103). NMP was purchased from Tedia (1000 Tedia Way, Fairfield, Ohio 45014). DMBZ, ODA, and BPDA were obtained from Chriskev, Inc. (13920 W. 108th Street, Lenexa, Kans. 66215). Dianhydrides were dried at 125° C. in vacuum for 24 hours before use. All other reagents were used without further purification.

Nitrogen-adsorption porosimetry was carried out with an ASAP 2000 surface area/pore distribution analyzer (Micrometrics Instrument Corp.). A Micrometrics Accupyc 1340 helium pycnometer was used to measure the skeletal density of the specimens. A TA model 2950 HiRes instrument was used to perform thermal gravimetric analysis (TGA). Thermomechanical analysis was performed using a TMA 2940 from TA Instruments. Infrared spectroscopy was performed using a Nicolet Nexus 470 FTIR spectrometer. A Bruker Avance 300 spectrometer was used to obtain $^{13}C$ NMR spectra of the polymers. Scanning electron microscopy (SEM) was performed using a Hitachi S-4700 field emission microscope after sputter-coating the specimens with platinum. Mechanical compression testing was performed following the ASTM D695-10 standard.

Experimental design and analysis were conducted using Design Expert, version 8.1, available from Stat-Ease, Inc. (Minneapolis, Minn., USA). An experimental design with three variables, including diamine (ODA or DMBZ, or a combination thereof), total polymer concentration (7 wt. % to 10 wt. %), and number of repeat units n (10-40) in the amine terminated oligomers, was carried out.

A total of 36 separate batches of aerogel actual examples were produced and tested to produce results show in Table 1, including eight repeats scattered randomly throughout the design to assess model reliability and accuracy. Data from the experiments were analyzed using multiple linear regression. A full quadratic equation of the variables, including all two-way interactions, was entertained for each response, and backward stepwise regression was carried out to eliminate terms deemed not significant from the model.

The example aerogels in accordance with embodiments were fabricated using the process shown in FIG. 1, starting with synthesis of amine end-capped polyimide oligomers with n repeat units using n equiv of BPDA and n+1 equiv of diamine. The polyimide oligomers were cross-linked with BTC to form gels. A concentration of total polymer in the gelation solution (7 wt. % to 10 wt. %), type of diamine used (DMBZ or ODA, or combination thereof), and number of repeat units in the oligomers (n=10-40) were varied.

For example, the procedure for formulation 9 from Table 1 using DMBZ, n=40, and polymer concentration of 7 wt. % was carried out as follows: BPDA (4.31 g, 14.6 mmol) was added to a solution of DMBZ (3.18 g, 15 mmol) in 80 mL of NMP, and the solution was stirred until fully dissolved. Then, acetic anhydride (11.07 mL) was added and stirred until homogeneously mixed, followed by TEA (2.04 mL). After about 15 minutes, a solution of BTC (0.065 g, 024 mmol) in 10 mL of NMP was added to this solution while stirring. Immediately after mixing, the solution was poured into the molds.

The solutions gelled after about 10 minutes to about 15 minutes. The gels were aged for 24 hours in the mold, and then they were extracted into a solution of 75% NMP in acetone and soaked overnight. The solvent was then replaced by a solution of 25% NMP in acetone and the gels were, soaked for another 24 hours, followed by three more solvent exchanges in 100% acetone at 24 hour intervals.

The gels were then converted to aerogels by supercritical fluid extraction. This was accomplished in multiple steps that included subcritical and supercritical $CO_2$ soaking and rinsing. The gels were submerged in acetone in a sealed chamber at 78 bar and 25° C. The chamber was then set in a soak mode for 30 minutes, followed by a subcritical liquid $CO_2$ flush equal to the volume of the chamber and repeated four times. Then, the temperature in the chamber was increased to 35° C. to reach a supercritical state of $CO_2$ and held for 30 minutes, followed by slow venting (10 g/min) for approximately 2 hours. This process was followed by vacuum drying overnight at 75° C. to remove residual acetone. The resulting aerogels had an observed density of 0.100 g/cm3 and a porosity of 92.6%. Solid $^{13}C$ NMR (ppm): 165.3, 136.2, 130.6, 123.4, 18.9. FTIR (δ): 1775.8, 17175, 1612.8, 1490.2, 1361.9, 1090.9.

All of the sample aerogels were made as described by first dissolving all of the diamine and adding dianhydride, with the exception of those made from 10 wt. % solution and a 50/50 combination of ODA and DMBZ as diamine. These examples were made by dissolving ODA in solution first, followed by all of the dianhydride. After the dianhydride was completely dissolved, DMBZ was added.

The actual examples and variables used to fabricate the aerogels are shown in Table 1, along with density, porosity, surface area, compression properties, and thermal data for each run.

TABLE 1

| sample | n | Diamine | polymer concn, wt % | density, g/cm3 | porosity, % | surface area, m2/g | modulus, MPa | stress at 10% strain (MPa) | onset of decomposition, ° C. |
|---|---|---|---|---|---|---|---|---|---|
| 1 | 30 | DMBZ | 10.0 | 0.132 | 90.2 | 513 | 45.4 | 1.5 | 510.2 |
| 2 | 10 | DMBZ | 10.0 | 0.108 | 92.0 | 526 | a | a | 500.0 |
| 3 | 30 | ODA | 10.0 | 0.153 | 90.0 | 405 | 28.8 | 0.87 | 598.7 |
| 4 | 10 | ODA | 10.0 | 0.123 | 91.3 | 440 | 18.6 | a | 602.5 |
| 5 | 30 | DMBZ | 7.0 | 0.097 | 92.9 | 550 | 24.0 | 0.67 | 510.9 |
| 6 | 10 | DMBZ | 7.0 | 0.077 | 94.3 | 539 | 11.0 | 0.36 | 526.3 |
| 7 | 30 | ODA | 7.0 | 0.120 | 92.1 | 418 | 12.6 | 0.48 | 594.0 |
| 8 | 10 | ODA | 7.0 | 0.090 | 94.1 | 466 | 12.0 | a | 592.2 |

TABLE 1-continued

| sample | n | Diamine | polymer concn, wt % | density, g/cm₃ | porosity, % | surface area, m₂/g | modulus, MPa | stress at 10% strain (MPa) | onset of decomposition, ° C. |
|---|---|---|---|---|---|---|---|---|---|
| 9  | 40 | DMBZ      | 7.0  | 0.100 | 92.6 | 555 | 40.5 | 0.76 | 514.6 |
| 10 | 40 | ODA       | 7.0  | 0.138 | 90.5 | 382 | 18.3 | 0.64 | 591.9 |
| 11 | 40 | DMBZ      | 10.0 | 0.138 | 89.8 | 542 | 74.8 | 1.65 | 515.9 |
| 12 | 30 | ODA       | 8.5  | 0.142 | 91.3 | 409 | 27.6 | 0.69 | 598.1 |
| 13 | 30 | ODA       | 8.5  | 0.142 | 89.8 | 406 | 19.7 | 0.64 | 587.3 |
| 14 | 30 | DMBZ      | 8.5  | 0.110 | 91.5 | 560 | 40.9 | 0.97 | 514.6 |
| 15 | 30 | ODA       | 8.5  | 0.135 | 89.8 | 409 | 16.3 | 0.61 | 584.1 |
| 16 | 30 | DMBZ      | 8.5  | 0.112 | 92.1 | 578 | 48.3 | 1.05 | 516.7 |
| 17 | 20 | DMBZ      | 10.0 | 0.128 | 89.9 | 546 | 48.5 | 1.35 | 511.1 |
| 18 | 30 | MU        | 8.5  | 0.116 | 91.8 | 531 | 27.2 | 1.11 | 513.3 |
| 19 | 20 | DMBZ      | 8.5  | 0.108 | 91.5 | 556 | 28.4 | 0.92 | 507.9 |
| 20 | 20 | ODA       | 8.5  | 0.142 | 89.5 | 395 | 18.3 | 0.66 | 580.0 |
| 21 | 20 | DMBZ      | 7.0  | 0.096 | 92.4 | 571 | 37.6 | 0.65 | 515.6 |
| 22 | 40 | ODA       | 8.5  | 0.157 | 88.4 | 444 | 22.0 | 0.81 | 583.9 |
| 23 | 20 | ODA       | 10.0 | 0.154 | 88.8 | 388 | 21.6 | 0.82 | 588.1 |
| 24 | 30 | DMBZ      | 8.5  | 0.116 | 91.5 | 558 | 70.4 | 1.10 | 510.3 |
| 25 | 20 | ODA       | 7.0  | 0.119 | 91.6 | 423 | 21.3 | 0.45 | 591.6 |
| 26 | 40 | ODA       | 10.0 | 0.177 | 87.4 | 374 | 37.6 | 1.08 | 589.1 |
| 27 | 20 | ODA       | 8.5  | 0.127 | 90.5 | 397 | 17.6 | 0.56 | 599.4 |
| 28 | 30 | DMBZ      | 8.5  | 0.111 | 91.6 | 548 | 34.3 | 1.04 | 515.5 |
| 29 | 30 | ODA       | 8.5  | 0.145 | 89.6 | 379 | 25.5 | 0.74 | 586.5 |
| 30 | 40 | DMBZ      | 8.5  | 0.120 | 90.8 | 488 | 38.0 | 1.16 | 520.9 |
| 31 | 20 | DMBZ/ODA  | 7.0  | 0.085 | 94.4 | 504 | 11.9 | 0.39 | 531.52 |
| 32 | 30 | DMBZ/ODA  | 7.0  | 0.092 | 93.5 | 476 | 15.4 | 0.47 | a |
| 33 | 40 | DMBZ/ODA  | 7.0  | 0.091 | 93.9 | 477 | 22.5 | 0.44 | 535.86 |
| 34 | 20 | DMBZ/ODA  | 10.0 | 0.120 | 88.1 | 493 | 28.5 | 0.77 | 544.73 |
| 35 | 30 | DMBZ/ODA  | 10.0 | 0.126 | 89.1 | 474 | 28.9 | 0.89 | 539.01 |
| 36 | 40 | DMBZ/ODA  | 10.0 | 0.132 | 87.3 | 437 | 33.1 | 0.97 | 540.41 |

The data based on the tested sample observations showed that BTC aerogels took substantially less time to gel than formulations of OAPS or TAB. For example, BTC aerogel samples were found to gel in about 5 to about 20 minutes, whereas OAPS or TAB aerogels may take up to an hour to gel.

Figure 2:
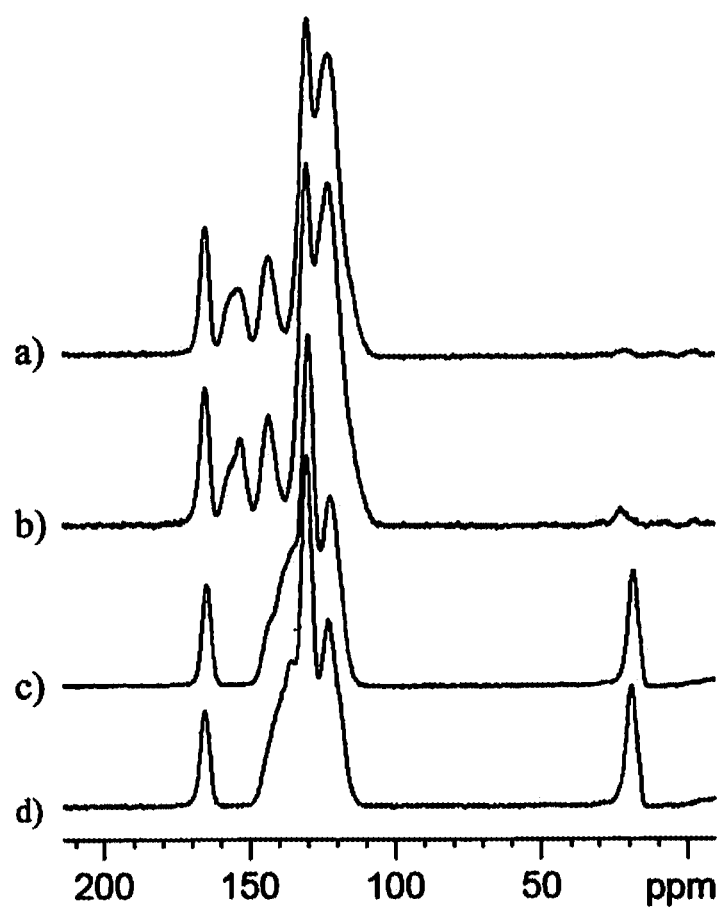
FIG. 2 shows NMR spectra of selected formulations of actual examples in accordance with embodiments.

FIG. 2 shows NMR spectra 200 of selected formulations from certain tested samples. In particular, FIG. 2 shows $^{13}$C CP-MAS spectra of representative aerogels from the study: a) ODA (sample 26, 10 wt. % n=40); b) ODA (sample 4, 10 wt. %, n=10; c) DMBZ aerogel (sample 11, 10 wt. %, n=40); d) DMBZ (sample 2, 10 wt. %, n=10).

Spectra of all aerogel formulations exhibited peaks for imide carbonyl (165.3 ppm) and aromatic carbons (120-145 pmm). ODA derived polyimide aerogels (FIG. 2 a, b) also have a peak at 1532 ppm (oxygen substituted aromatic carbon) and a small peak at 23 ppm which may indicate a small amount of acylation of the amine end-caps due to a side reaction with acetic anhydride. DMBZ aerogels (FIG. 2c, d) have a methyl peak at 18.9 ppm and no evidence of acylation. MIR of the aerogels exhibited imide carbonyl peaks (1776, 1717 cm$^{-1}$), and TGA curves showed very little weight loss below the onset of decomposition at 500° C. to 600° C., indicating that imidization at room temperature has gone to completion.

Figure 3:
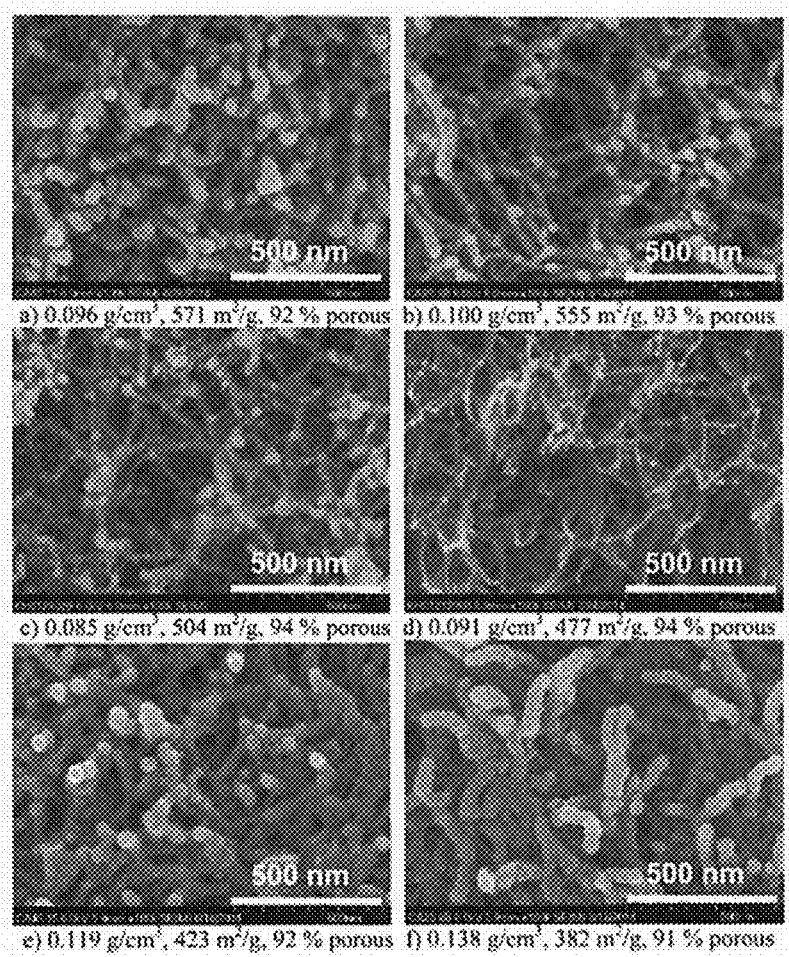
FIG. 3 shows scanning electron microscopy results of actual example aerogels made with 7 wt. % polymer concentration using the process of FIG. 1 in accordance with an embodiment.

Sample aerogels made in accordance with processes of embodiments were found to exhibit advantageous structure and properties. Scanning electron microscopy (SEM) results 300 of representative aerogels made with 7 wt. % polymer concentration are shown in FIG. 3. The aerogels have a somewhat fibrous appearance. DMBZ containing formulations (FIG. 3 a) and FIG. 3 b)) and those derived from 50% DMBZ and 50% ODA (FIG. 3 c) and FIG. 3 d)) had finer strands than those derived from ODA alone (FIG. 3 e) and FIG. 3 f)). Samples made from 10 wt. % polymer concentration and either ODA or DMBZ alone had morphologies very similar to those shown at 7 wt. %.

Figure 4:
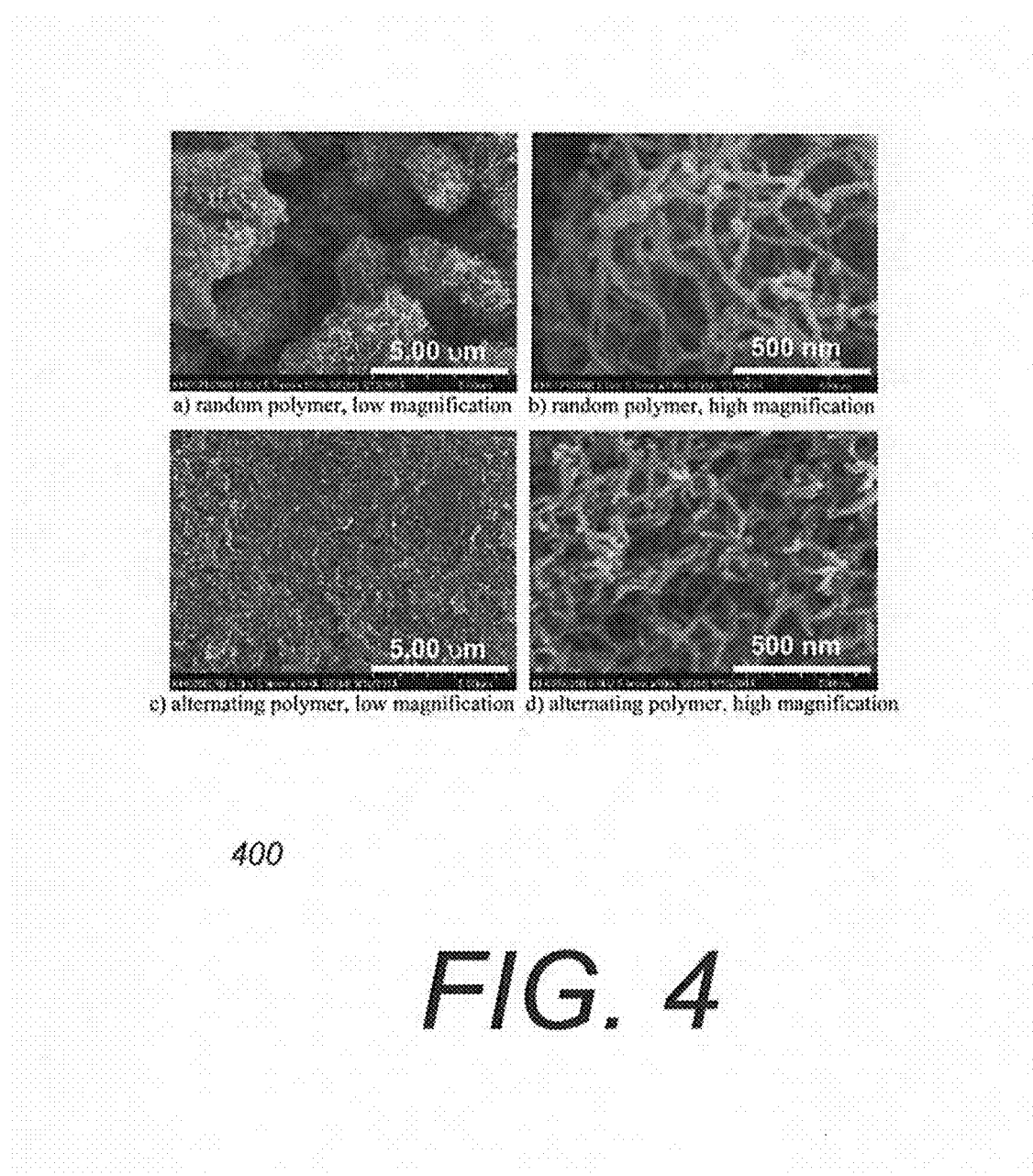
FIG. 4 shows scanning electron microscopy results of polyimide aerogels made with DMBZ/ODA and 10 wt. % polymer using the process of FIG. 1 in accordance with an embodiment.

As seen in FIG. 4, however, aerogels made using 50% DMBZ and 50% ODA at 10 wt. % looked very different. FIG. 4 shows SEM results 400 of polyimide aerogels made with DMBZlODA and 10 wt. % polymer and n=20 (sample 34) where diamines are reacted randomly at (a) low magnification and (b) high magnification and where diamines are forced to react in alternating fashion at (c) low magnification and (d) high magnification.

FIG. 4 a) and FIG. 4 b) show SEM results of DMBZ/ODA aerogel made with n=20 and 10 wt. %. These display a more coarse structure that at lower magnification shows that the polymer strands have organized into spheres.

It was found that lowest n and highest concentration lead to the fastest gel times. Slower gelation may allow the polymer chains to equilibrate. This type of hierarchical porosity had not been observed in OAPS cross-linked aerogels made using 10 wt. % polymer and 50% DMBZ/50% ODA which also tend to gel slower. This was solved by making the 10 wt. % DMBZ/ODA aerogels in a way that forces an alternating structure in the oligomer backbone. This was achieved by dissolving first one diamine (ODA) in the reaction mixture, followed by all of the dianhydride. This creates a solution that consists mostly of n=1 oligomers of the structure BPDA-ODA-BPDA. Addition of DMBZ should result in an amine capped oligomer backbone with the amines alternating. As shown in FIG. 4 c) and FIG. 4 d), morphology of these aerogels with an alternating backbone more closely resembles the rest of the aerogels in the study made using either ODA or DMBZ. Thus, this technique prevents macroscale phase separation from occurring during gelation. Because the difference in morphology can affect other aerogel properties, the data given for the DMBZ/ODA aerogels in Table 1 are all from the alternating structures.

Surface areas of the BTC cross-linked aerogels were measured using nitrogen sorption analyzed by the Brunauer-Emmett-Teller (BET) process. Highest surface areas were measured for DMBZ derived aerogels (>500 m$^2$/g), followed by those made from DMBZ/ODA. The lowest surface areas were measured for the ODA derived aerogels and range from 375 m$^2$/g to 450 m$^2$/g. The ranking is similar to surface areas observed for DMBZ and ODA aerogels with TAB or OAPS cross-links. The surface areas of the BTC cross-linked aerogels are, however, 50 m$^2$/g to 100 m$^2$/g higher in all cases. For example, for TAB cross-linked aerogels previously reported with ODA/BPDA in the backbone produced from 10 wt. % solutions, surface areas ranged from 202 m$^2$/g to 412 m$^2$/g. Similar OAPS cross-linked aerogels with ODA/BPDA had surface areas ranging from 254 m$^2$/g to 366 m$^2$/g, while the samples, under the same conditions, had surface areas ranging from 375 m$^2$/g to 440 m$^2$/g depending on n. Similar increases in surface area are seen for DMBZ/BPDA aerogels (515 m$^2$/g to 546 m$^2$/g) compared to the TAB cross-link aerogels previously reported (314 m$^2$/g to 472 m2/g). Higher surface areas were obtained at lower polymer concentrations.

Pore volume versus pore diameter of the actual example polyimide aerogels made with either ODA or DMBZ were determined. The pore size distributions obtained were centered around 20 nm to 30 nm for both DMBZ and ODA aerogels. The results for aerogels made using 7 wt. % polymer concentration and those made using a polymer concentration of 10 wt. % looked the same. Adsorption isotherms for these aerogels are IUPAC classification type IV isotherms with H1 or H2 hysteresis. In contrast, the 50% DMBZ/50% ODA aerogels made with 10 wt. % concentrations and using an alternating backbone are similar to the ones made with ODA or DMBZ alone, with the bulk of the pores centered around 20 nm to 40 nm.

DMBZ/ODA aerogels with a random backbone showed a sharper pore size distribution centered at 6 nm to 7 nm and a much smaller, broad peak centered around 30 nm. This indicates that the hierarchical pore structures give rise to a much finer pore structure inside the larger framework. The bimodal pore size distribution is also exhibited by the shape of the adsorption isotherms. The adsorption isotherm is an IUPAC type IV indicative of mesoporosity, but with H3 hysteresis, reflecting the more complex bimodal pore distribution and presence of micropores.

As previously observed for OAPS and TAB cross-linked aerogels, ODA-containing aerogels shrink more than DMBZ-containing aerogels, as measured by comparing the diameter of the aerogels to the diameter of the syringe molds used to form the gels. Some of this shrinkage occurs during formation of the gels, some during solvent exchange, and some during the supercritical drying process. Shrinkage is the total shrinkage occurring during the complete fabrication cycle, as it would be difficult to measure shrinkage of the wet gels.

Of the tested samples shown in Table 1, DMBZ/ODA aerogels had the lowest shrinkage. Shrinkage was found to increase with increasing n for all backbones. Thus, it follows that the lowest density aerogels are produced from DMBZ/ODA at the lowest n. Compared to TAB cross-linked aerogels of the same backbone chemistry, shrinkage and density are slightly lower for the tested samples made in accordance with embodiments, while they are similar or slightly lower compared to OAPS cross-linked versions. For example, for TAB cross-linked aerogels previously reported with ODA/BPDA in the backbone produced from 10 wt. % solutions, densities ranged from 0.19 g/cm$^3$ to 0.2 g/cm$^3$, while in this study of actual examples in accordance with embodiments, densities from the same conditions ranged from 0.12 g/cm$^3$ to 0.18 g/cm$^3$ depending on n. For OAPS cross-linked aerogels previously reported with ODA/BPDA made using 10 wt. % polymer concentration, densities ranged from 0.157 g/cm$^3$ to 166 g/cm3, within the same range as BTC versions in tested actual examples of Table 1. Similar decreases in density were observed for DMBZ/BPDA aerogels in the actual example test study (0.10 g/cm$^3$ to 0.12 g/cm$^3$) compared to the TAB cross-link aerogels previously reported (0.0.13 g/cm$^3$ to 0.15 g/cm$^3$) from 10 wt. % polymer concentration, while OAPS cross-linked versions with DMBZ (0.086 g/cm$^3$ to 0.089 g/cm$^3$) tended to be lower in density than the BTC aerogels. The porosity of tested samples was found to be highest for DMBZ/ODA derived aerogels, and porosity decreases with increasing n and polymer concentration.

Compression tests were performed on all of the aerogels tested as shown in Table 1. Typical stress-strain curves were determined, and a Young's modulus was taken as the initial slope of the stress strain curve. The modulus was determined to be highest for DMBZ aerogels, significantly increasing with increasing polymer concentration and, surprisingly, increasing n. Increasing n resulted in greater distance between cross-links, which might be expected to result in a decrease in modulus. Because increasing n resulted in more shrinkage, however, it is believed that higher density leads to increase in modulus.

Because DMBZ in the polymer backbone results in lower shrinkage and lower density, one might expect lower modulus. The modulus is higher, however, because of the greater stiffness of the DMBZ backbone. Compressive strength tests and data taken as the stress at 10% strain showed the same trends as modulus with the highest strength aerogels being those made from DMBZ at n=40, and polymer concentration of 10 wt. % and the surfaces for ODA and DMBZ/ODA nearly overlapping.

Young's modulus (and compressive strength) typically scales with density in aerogels with similar backbone chemistry. This is true of BTC cross-linked polyimide aerogels. It was found that DMBZ derived aerogels at a similar density are the highest in modulus compared to those made with DMBZ/ODA or ODA alone. Moreover, the BTC cross-linked aerogels are of similar or higher modulus than OAPS cross-linked aerogels at a similar density using the same backbone chemistry.

It might be expected that using BTC as a cross-link could lower the thermal stability compared to other cross-links because of the resulting amide structure. The onsets of decomposition were found to be quite similar, however, to TAB cross-linked aerogels. It was found that backbone chemistry has the largest effect on onset of decomposition. Polymer concentration has no effect on onset of decomposition over and above random error. The effect of n can be interpreted as the effect of cross-linker on onset of decomposition, because BTC concentration goes up with decreasing n.

It was found that the onset of decomposition increases slightly with increasing n (decreasing BTC) when DMBZ is the diamine (100% DMBZ), but, the opposite is true when ODA is the diamine (0% DMBZ). This suggests that BTC is more thermally stable than DMBZ, but, slightly less thermally stable than ODA. Nevertheless, the effect of degradation on the cross-link chemistry is small.

Onset of decomposition is not the limiting factor in long-term use temperature for the polyimide aerogels. Rather, shrinkage occurs in the aerogels on heating at 150°

C. and higher which limits the use temperature. At a given temperature, shrinkage occurs in the first hour or so of aging and then changes little after that. An actual example aerogel formulation formed in accordance with an embodiment was heated for 500 hours at either 150 or 200° C. Weight loss was negligible, and density tended to level off after the initial increase. In all cases, weight loss over the aging time was less than 1%.

Based on empirical models for shrinkage and density of the actual example aerogels after 24 hours of heating at either 150 or 200° C., it was observed that the highest shrinkage occurs for aerogels made using 100% DMBZ. After 150° C. aging, total shrinkage of DMBZ aerogels was around 40% (including shrinkage during processing), resulting in aerogels of about 0.38 g/cm$^3$. After 200° C. aging, total shrinkage was around 50%, resulting in a density of about 0.64 g/cm$^3$ after heating. At 150° C., the lowest shrinkage was seen for aerogels made with 50% DMBZ/50% ODA and n=40.

After 150° C., total shrinkage of these aerogels is around 27%, leading to aerogels of 020 g/cm$^3$. After 200° C., aerogels made using ODA or DMBZ/ODA have similar shrinkage and density with total shrinkage around 40% to 45%, leading to aerogels of 035 g/cm$^3$ to 0.4 g/cm$^3$.

Accordingly, polyimide aerogels with polyamide cross-links were fabricated using amine end-capped polyimide oligomers and a triacid cross linker such as BTC. The use of this alternative and cost-effective cross-linker yields aerogels enhanced properties over those previously made with more costly or non-commercially available cross-linkers, including OAPS, TAPP, and TAB. Modulus from compression was found to be comparable to or better than OAPS cross-linked polyimide aerogels of similar density, while surface areas were found to be significantly higher than previously reported polyimide aerogels.

Because triacid cross linkers such as BTC are both commercially available and less expensive than other cross-linkers, polyimide aerogels derived from BTC, DMBZ or a combination of DMBZ and ODA may be cost-effective enough for use as insulation for refrigeration, clothing, industrial pipelines, or building and construction.

While the thermal stability might be expected to be lower for the BTC cross-linked polyimide aerogels, onsets of decomposition were found to be dependent on the backbones of the oligomers. The use temperature of the aerogels is not limited by the thermal stability of the polymer but rather by shrinkage that occurs on aging at temperatures of 150° C. and above. Shrinkage may occur on initial heating and level off. As such, it is possible to precondition the samples for a particular use temperature. Formulations with a combination of 50% DMBZ/50% ODA may shrink the least, resulting in aerogels with density of 0.20 g/cm$^3$ if preconditioned to 150° C. and aerogels with density of 035 g/cm$^3$ if preconditioned to 200° C.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that embodiments of the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. An aerogel, comprising:
    a polyimide oligomer component; and
    a triacid chloride cross-link, the triacid chloride cross-link connected to the polyimide oligomer component, the polyimide oligomer component comprising a reaction product of a combination of diamines and a dianhydride in a ratio of (n+1) to n where n is the number of repeat units in the oligomer.

2. The aerogel of claim 1, wherein the combination of diamines includes equal parts of a first diamine and a second diamine.

3. The aerogel of claim 2, wherein the polyimide oligomer component comprises a backbone structure wherein the first and second diamines alternate.

4. The aerogel of claim 3, wherein the first diamine comprises one of oxydianiline (3,4'-ODA) and 4,4'-oxydianiline (4,4'-ODA).

5. The aerogel of claim 4, wherein the second diamine comprises 2,2'-dimethylbenzidine (DMBZ).

6. The aerogel of claim 3, wherein n is between 10 and 30.

7. The aerogel of claim 3, containing a polymer concentration greater than or equal to 7 wt. % and less than or equal to 10 wt. %.

8. The aerogel of claim 7, wherein the dianhydride can is selected from the group consisting of benzophenone-3,3',4,4'-tetracarboxylic dianhydride (BTDA), 2,2'-bis(3,4'-dicarboxyphenyl)hexafluoropropane dianhydride (6FDA), and biphenyl-3,3',4,4'-tetracarboxylic dianhydride (BPDA).

9. An aerogel, comprising:
   a polyimide oligomer component; and
   a triacid chloride cross-link, the triacid chloride cross-link connected to the polyimide oligomer component, the polyimide oligomer component comprising a reaction product of a combination of diamines and a combination of dianhydrides in a ratio of (n+1) to n where n is the number of repeat units in the oligomer.

* * * * *